April 10, 1951 W. J. FRANTZ 2,548,211

SOUND REPRODUCING SYSTEM

Filed Dec. 4, 1945

INVENTOR
WALTER J. FRANTZ.
BY H. S. Grover
ATTORNEY

Patented Apr. 10, 1951

2,548,211

UNITED STATES PATENT OFFICE 2,548,211

SOUND REPRODUCING SYSTEM

Walter J. Frantz, Princeton, N. J., assignor to Radio Corporation of America, a corporation of Delaware Application December 4, 1945, Serial No. 632,725

2 Claims. (Cl. 179—100.4)

Figures 1, 2:
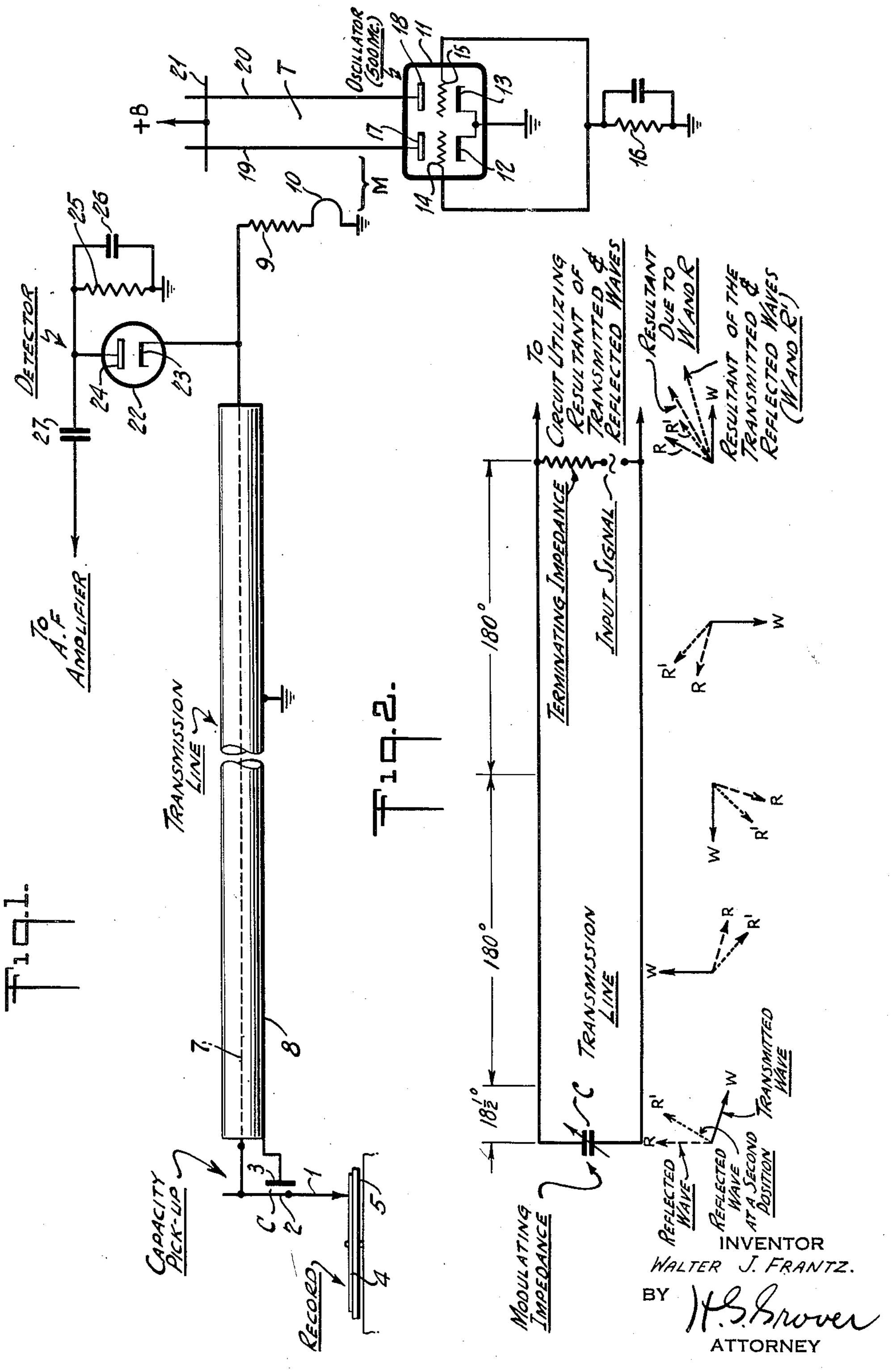

My present invention relates generally to transducer systems of an improved type, and more specifically to a record reproducer system employing high frequency oscillations.

An important object of my present invention is to provide a carrier modulating system which essentially comprises a transmission line of a predetermined electrical length provided with a modulating reactive impedance as the terminating element, there being provided a source of high frequency oscillations at the input of the line thereby to transmit waves along the line, and the modulating impedance being variable to cause the waves to be reflected at a variable angle back along the line to a pair of output terminals from which there is derived the resultant of the transmitted and reflected waves in the form of amplitude modulated high frequency waves.

Another important object of my invention is to provide a method of reproducing sound waves which includes the steps of transmitting high frequency waves along a transmission line of a predetermined electrical length, and causing the transmitted waves to be reflected from the end of the line by a terminating reactance whose magnitude is varied in accordance with the sound waves, and extracting from a predetermined point on the line amplitude modulated waves which are produced by the combination of the transmitted and reflected waves.

Another object of this invention is to provide a sound record reproducing system which utilizes a capacity type of pickup device, the system consisting of an ultra-high frequency oscillator transmitting waves of a predetermined frequency along a transmission line, the capacity pickup device functioning as a termination at the receiving end of the transmission line, and there being provided a detector at the input end of the transmission line for detecting amplitude modulation oscillations whereby the detector output is of relatively high output level and high fidelity.

Another object of this invention is to provide a phonograph system which utilizes a capacity type of pickup device, a high frequency oscillator and a simple peak voltage diode detector.

Still other objects of my invention are to improve generally the efficiency and reliability of record reproducers, and more especially to provide high frequency record reproducing systems which are not only economical to manufacture and assemble, but are adapted to occupy a minimum of space.

Other features and advantages of my invention will best be understood by reference to the following description, taken in connection with the drawing, in which I have indicated a circuit organization whereby my invention may be carried into effect.

In the drawing:

Fig. 1 shows circuit details of an embodiment of the invention, certain parts being schematic; and Fig. 2 is a schematic representation of the principle of the invention.

Referring now to the accompanying drawing, wherein like reference numerals in the different figures indicate similar elements, there is shown in Fig. 1 the circuit diagram of a system adapted to reproduce sound records of any suitable type. The usual tone arm for the pickup and stylus is not shown. Those skilled in the art of phonograph construction are fully aware of the manner of constructing the tone arm, turntable, and associated parts thereof. Accordingly, only so much of the mechanical elements are described herein as are essential to a proper understanding of my invention. The pickup device consists of a reactive element whose reactance is varied in response to displacements of a stylus or needle 1 as it follows the undulations of a record groove. The reactive element specifically is a condenser C consisting of a mobile electrode 2 and a stator, or fixed, electrode 3. The stylus 1 is mechanically coupled to the mobile electrode 2 in any suitable manner. By way of example, capacity C may be provided by a condenser of the ribbon type disclosed and claimed in U. S. Patent No. 2,376,456, granted May 22, 1945, to Chester M. Sinnett. However, my invention is in no way restricted to a particular construction of capacity pickup device.

The stylus 1 is adapted to scan, or ride, the sound-representative grooves of a suitable sound record 4 as the latter is rotated on a turntable 5. The vibration of the stylus 1 causes corresponding vibration of electrode 2 thereby to vary the capacity of condenser C in a corresponding manner. My invention is not limited to condenser C being a record pickup device, since the electrode 2 could be varied by the diaphragm of a microphone. Further, the mobile electrode 2 could be displaced in response to any physical change thereby to cause an electrical indication at the utilization circuit. In general, the letter C may denote any suitable modulating reactance.

In accordance with my invention, the electrodes 2 and 3 are coupled or connected to respective conductors of a transmission line of a predetermined electrical length. For example, conductor 7 is connected at one end to electrode 2, while conductor 8 at the corresponding end is connected to electrode 3. The conductors 7, 8 may be provided by a co-axial cable, wherein conductor 8 is a grounded sheath. The electrode 3 is, then, at ground potential.

The high frequency wave input terminals of the transmission line are located at the end of the line opposite to the end which includes the terminating reactive impedance C. The wave input end of the line consists of a resistive impedance 9 whose magnitude is substantially equal to the impedance of the transmission line. The upper end of resistor 9 is connected to the conductor 7, while the lower end of the resistor is connected to ground through the pickup loop 10. The loop 10 may be provided by a suitably bent piece of wire.

The loop 10 is loosely coupled by mutual inductance M to the tank circuit T of the ultra-high frequency oscillator. The oscillator may be of any suitable and well-known type generally employed for producing ultra-high frequency oscillations. My invention is not limited to any particular oscillator construction, and it is to be clearly understood that the specific ultra-high frequency oscillator circuit shown in Fig. 1 is merely illustrative of one form of oscillator circuit. For the purpose of this application it is assumed that the oscillator is producing ultra-high frequency waves of a predetermined frequency such as 500 megacycles (mc.).

The oscillator tube 11 is shown as a twin triode tube of the 6J6 type. This is a miniature tube, and it has its cathodes 12 and 13 connected in common to ground. The grids 14 and 15 are connected in common to the ungrounded end of bypassed resistor 16, while the respective plates 17 and 18 have positive direct current voltage applied thereto from a siutable direct current source (not shown). The tank circuit T consists of a pair of Lecher wires 19 and 20 whose effective inductance is varied by a slidable conductor 21. The +B terminal of the direct current source is connected directly to the conductor 21, and through the conductors 19 and 20 to the respective plates 17 and 18. It will be recognized that the tank circuit T may be adjusted for oscillation at 500 mc. by suitable adjustment of conductor 21.

In this way the high frequency waves are caused to be transmitted along the transmission line 7, 8. The capacity device C is located at the receiving end of the line, since it is the terminating impedance of the line. The incident waves are reflected back along the line, and at the input, or generator, end of the line there is coupled a device for responding to the resultant of the transmitted and reflected waves. Any desired type of detector device may be utilized. For the sake of simplicity of the description the detector has been shown as a diode rectifier 22, whose cathode 23 is connected to the upper end of resistor 9. The anode 24 of the diode is connected to ground through an output load resistor 25 which is bypassed for high frequency currents by condenser 26. Across the load resistor 25 there are produced voltage variations which correspond to the modulating variations of the reactance C. Where the modulating variations of the reactance C are responsive to the sound grooves of a sound record 4, the condenser 27 will take off from output resistor 25 audio frequency voltage which may be amplified in any suitable audio frequency amplifier followed by a sound reproducer, such as a loud speaker.

In Fig. 2 there is shown a generalized, or schematic, representation of the sound reproducing system depicted in Fig. 1. In Fig. 2 conductors 7 and 8 are shown arranged in parallel, with the modulating reactive impedance C connected across the receiving end of the transmission line. The impedance is indicated as being variable thereby to cause reflection of the incident waves at a variable angle. At the transmission, or input, end of the line the resistor 9 is shown connecting one of the input terminals to the conductor 7. while the other input terminal is connected to the conductor 8. The input ends of the conductors 7 and 8 are indicated as being adapted for connection to the response circuit for supplying it with the resultant of the input and reflected waves. The transmitted wave is indicated by the solid vector W. The vectors R and R′, shown in dash line and dotted line respectively, denote the reflected waves at different phase displacements corresponding to variations in the capacity of the modulating reactive impedance C. From Fig. 2 it is readily seen that variations in the angle of the reflected wave corresponding to variations of C produce variations in the resultant of the transmitted and reflected waves at the terminals of the utilizing circuit.

In addition to various illustrative constants which have been specified heretofore, it is pointed out that the load resistor 25 may have a magnitude of 50,000 ohms; condenser 26 may have a magnitude of 100 micromicrofarads and condenser 27 may have a value of 0.1 microfarad. There are, of course, purely illustrative constants. In designing the transmission line, the circuit designer has various factors to consider. It is not believed necessary to burden the present description with a detailed mathematical analysis of the permissible amplitude modulation of a carrier with a capacity type pickup by the reflection method. A mathematical analysis reveals that maximum sensitivity occurs when the normal or static reactance of the condenser C is equal in magnitude to the characteristic impedance of the transmission line. Also, amplitude modulation of the order of 3 percent may be produced at a very low distortion level if the proper electrical length is chosen for the transmission line. Assuming that the capacity pickup is essentially a parallel plate condenser, the proper electrical length of the transmission line is 18½ degrees longer than any integral multiple of a half wave length.

Stray and fringing capacity, oscillator loading, attenuation of the transmission line, and impedance mismatch at the sending end of the transmission line may change the relationship between the output voltage and the mechanical motion actuating the pickup condenser. Such a functional change shifts the region of best linearity requiring some other electrical length of the transmission line. It is advisable, therefore, normally to allow for functional variations by rendering the oscillator frequency tunable as by shifting the conductor 21.

Analysis indicated, as stated before, that 3% modulation of a radio frequency carrier is possible with very low distortion. The carrier level can be at least 1 volt R. M. S. without appreciable oscillator loading if the 6J6 type tube, or its equivalent, is used for the oscillator tube 11. For these conditions the detected audio voltage across resistor 25 would be 0.03 volt R. M. S. Increasing the coupling M increases the audio output voltage, but loads the oscillator to a certain extent.

The only limitation upon the location of the circuit components with respect to the usual tone arm of a phonograph is the attenuation of the transmission line. The functional variation caused by the attenuation of 3 to 5 feet of suitable transmission line at 500 mc. is practically negligible. On lower oscillator frequencies longer lengths of transmission line are permissible.

In use, it is only necessary to place a record 4 upon turntable 5, and then place a suitable stylus 1 upon the record face. As the oscillator causes waves to be transmitted along the line 7, 8 towards the modulating impedance C, the varying capacity of the pickup device will cause the waves to be reflected in variable phase relation to the incident waves. The resultant of the transmitted and reflected waves provides an amplitude modulated carrier wave across the circuit 9, 10, and the detector 22 will derive an audio frequency voltage across resistor 25 which is representative of the record grooves.

It is to be clearly understood that from a generic viewpoint the method disclosed herein may be practiced by varying the magnitude of the reactance C in response to any modulating signal. However, the utilizing circuit coupled to the output terminals of the line 7, 8 can be of any nature other than the demodulator. In general, there is provided herein a method of producing amplitude modulative carrier waves by the combination of incident and reflected waves along a transmission line whose terminating impedance is a variable reactance and is located at the receiving end of the line.

While I have indicated and described a system for carrying my invention into effect, it will be apparent to one skilled in the art that my invention is by no means limited to the particular organization shown and described, but that many modifications may be made without departing from the scope of my invention.

What I claim is:

1. In a record reproducing system for reproducing record signals recorded as signal variations on a record member; variably capacitive signal pick-up elements for cooperation with the signal variations of the record member to correspondingly vary the capacitance of the pick-up elements; high frequency energy supply structure for generating electric waves; said capacitive pick-up elements forming a terminating part of transmission line means coupled to said supply structure for conducting the electric waves to said pick-up elements, reflecting them at, and conducting the reflected waves back from said pick-up elements; said reflected waves having phase angle displacements varying in accordance with the capacitive variations of the pick-up elements, and producing, at any portion of the transmission line means, signal modulated waves corresponding to variations in amplitude of the resultant of the combined unreflected and reflected waves; and output structure coupled to a portion of the transmission line means remote from the pick-up elements for delivering the signal modulated waves; said transmission line means including a transmission line having a characteristic impedance; and said variably capacitive pick-up elements being connected to an end of said line and having a static reactance approximately equal in magnitude to the characteristic impedance of said line.

2. In a record reproducing system for reproducing record signals recorded as signal variations on a record member; variably capacitive signal pick-up elements for cooperation with the signal variation of the record member to correspondingly vary the capacitance of the pick-up elements; high frequency energy supply structure for generating electric waves having a frequency of the order of 500 megacycles per second; transmission line means, including a transmission line having a characteristic impedance, said capacitative pick-up element being connected to an end of said line and forming a terminating part of said transmission line means and having a static reactance approximately equal in magnitude to the characteristic impedance of the transmission line; said transmission line means being coupled to said supply structure for conducting the electric waves to said pick-up elements, reflecting them at, and conducting the reflected waves back from said pick-up elements; said transmission line means having an effective electrical length about 18½ degrees longer than the wave length of the conducted waves; said reflected waves having phase angle displacements varying in accordance with the capacitive variations of the pick-up elements, and producing, at any portion of the transmission line means, signal modulated waves corresponding to variations in amplitude of the resultant of the combined unreflected and reflected waves; and output structure coupled to a portion of the transmission line means remote from the pick-up elements, for delivering the signal modulated waves.

WALTER J. FRANTZ.

REFERENCES CITED

The following references are of record in the file of this patent:

UNITED STATES PATENTS

| Number | Name | Date |
|---|---|---|
| 1,732,427 | Andrews | Oct. 22, 1929 |
| 2,039,405 | Green | May 5, 1936 |
| 2,209,541 | Rust | July 30, 1940 |
| 2,428,272 | Evans | Sept. 30, 1947 |